(12) United States Patent
Ullrich et al.

(10) Patent No.: US 11,360,194 B2
(45) Date of Patent: Jun. 14, 2022

(54) OPTICAL DEVICE FOR DETECTING A REFLECTED LIGHT BEAM

(71) Applicant: RIEGL LASER MEASUREMENT SYSTEMS GMBH, Horn (AT)

(72) Inventors: Andreas Ullrich, Gablitz (AT); Rainer Reichert, Horn (AT); Andreas Hofbauer, Zwettl (AT)

(73) Assignee: RIEGL LASER MEASUREMENT SYSTEMS GMBH, Horn (AT)

( * ) Notice: Subject to any disclaimer, the term of this patent is extended or adjusted under 35 U.S.C. 154(b) by 890 days.

(21) Appl. No.: 16/182,685

(22) Filed: Nov. 7, 2018

(65) Prior Publication Data
US 2019/0162827 A1    May 30, 2019

(51) Int. Cl.
*G01S 7/481*    (2006.01)
*G01S 17/08*    (2006.01)

(52) U.S. Cl.
CPC .......... *G01S 7/4816* (2013.01); *G01S 7/4812* (2013.01); *G01S 7/4814* (2013.01); *G01S 17/08* (2013.01)

(58) Field of Classification Search
CPC .... G01S 7/4816; G01S 7/4812; G01S 7/4814; G01S 17/08; G01C 3/00; G01C 3/08
See application file for complete search history.

(56) References Cited

U.S. PATENT DOCUMENTS

| | | | | |
|---|---|---|---|---|
| 3,719,421 | A | * | 3/1973 | Poilleux ............... G01B 11/026 356/4.06 |
| 8,711,215 | B2 | * | 4/2014 | Imamura .................. G02B 7/28 348/135 |
| 2002/0093638 | A1 | | 7/2002 | Seifert et al. |
| 2010/0195087 | A1 | * | 8/2010 | Ossig ................... G01C 15/002 356/5.01 |

(Continued)

FOREIGN PATENT DOCUMENTS

| | | |
|---|---|---|
| DE | 19907546 A1 | 10/1999 |
| DE | 10051302 A1 | 4/2002 |

(Continued)

OTHER PUBLICATIONS

Austrian Office Action dated Apr. 27, 2018.
Extended European Search Report in corresponding European Patent Application No. EP 18 19 8447, dated Apr. 10, 2019.

*Primary Examiner* — Yuqing Xiao
*Assistant Examiner* — Jempson Noel
(74) *Attorney, Agent, or Firm* — Hoffmann and Baron, LLP

(57) ABSTRACT

An optical device for detecting a light beam reflected by a remote target comprises a light source, which is designed to emit the light beam in a predetermined direction at the remote target, and a primary lens, which is designed to focus the light beam reflected by the remote target into a first focal point. The optical device further comprises a relay lens system, which is arranged in such a way that the first focal point is located between the primary lens and the relay lens (Continued)

system and which is designed to focus the light beam reflected by the remote target and diverging starting from the first onto a second focal point. A detector unit is essentially arranged in the second focal point. A diaphragm is arranged within a cross-section, which is normal to the optical axis, of the light beam reflected by the remote target between the first focal point and the relay lens system.

20 Claims, 6 Drawing Sheets

(56) References Cited

U.S. PATENT DOCUMENTS

2019/0146070 A1\* 5/2019 Hansson ............... G01S 7/4812
356/5.09

FOREIGN PATENT DOCUMENTS

| DE | 102008014275 | A1 | | 8/2009 | |
|----|--------------|----|---|--------|---|
| EP | 0370770 | A1 | | 5/1990 | |
| EP | 0503874 | A2 | | 9/1992 | |
| EP | 3182159 | A1 | * | 6/2017 | ........... G01S 7/4817 |
| JP | 2009008404 | A | * | 1/2009 | ............. G01S 17/46 |
| JP | 2009008404 | A | | 1/2009 | |
| WO | 200026617 | A1 | | 5/2000 | |

\* cited by examiner

OPTICAL DEVICE FOR DETECTING A REFLECTED LIGHT BEAM

CROSS-REFERENCE TO RELATED APPLICATIONS

This application claims priority to the Austrian Patent Application No. A 50982/2017 filed Nov. 27, 2017, the disclosure of which is incorporated herein by reference.

TECHNICAL FIELD

The present disclosed subject matter relates to an optical device for detecting a light beam reflected by a remote target, comprising a light source, which is configured to emit the light beam in a predetermined direction at the remote target, a primary lens, which has an optical axis that is located substantially parallel to said predetermined direction and which is configured to focus the light beam reflected by the remote target into a first focal point, and a detector unit for detecting focused light.

BACKGROUND ART

Such optical devices are used, for example, in laser measuring technology, in which a laser beam is emitted and reflected by a remote target, the reflection thereof being detected in a detector. Thereupon, the distance of the remote target can be inferred from the difference between the emission time and the reception time.

So as to detect the light beam reflected by the remote target in a detector, the incident light beam is focused. For this purpose, what is known as a primary lens is arranged in the optical path of the light beam reflected by the remote target, which focuses the light beam reflected by the remote target onto a focal point in which the detector is arranged. Since remote targets are located far away in relation to the order of magnitude of the optical device, the radiation directions of the emitted light beam and of the light beam reflected by the remote target can be considered to be parallel.

One problem that arises with such optical devices, however, is that the emitted light beam is reflected not only by the remote target to be measured, but also by interfering "nearby targets" in the air, such as dirt particles or insects. The light beams reflected by such interferences are detected by the detector and create undesirable results and/or measuring errors.

It is known from the prior art to solve this problem by ascertaining, based on the time of flight of the light beam, which reflections stem from the near range distance, as is described in WO 2016/173711 A1, for example. Near range reflections thus ascertained can then be deleted, based on calculations, from the overall result of the reflections. These arithmetic solutions, however, are not suitable, in particular, in the case of laser scanners having "multiple time around" capability, in which multiple laser pulses are simultaneously located on the path between the light source and the remote target, whereby a direct association of results to times of flight is only possible to a limited degree.

BRIEF SUMMARY

It is the object of the disclosed subject matter to create a device that overcomes these problems and enables an improved measurement of far range targets.

For this purpose, the disclosed subject matter creates an optical device of the type described at the outset, in which the detector unit is arranged in such a way that the first focal point is located between the primary lens and the detector unit, wherein a diaphragm is arranged within a cross-section, which is normal to the optical axis, of the light beam reflected by the remote target, the diaphragm being arranged between the first focal point and the detector unit, and wherein the diaphragm is configured to block a higher portion of light beams reflected by a nearby target, which is closer to the primary lens than the remote target, than of light beams reflected by the remote target, to attenuate a near range sensitivity of the optical device.

The disclosed subject matter solves the problem of undesirably detected near range targets by attenuating the near range sensitivity of the optical device, and achieves this object by using a diaphragm acting between the first focal point and the detector unit in a distance-selective manner. The spacing between the detector unit and the first focal point, for example at a predetermined distance of at least 100 µm, creates the additional path length required for the diaphragm according to the disclosed subject matter in the optical path of the light beam reflected by the remote target.

The diaphragm creates the option of suppressing a higher portion of light reflected by nearby targets compared to that reflected by the remote target in that the diaphragm is located in the region of the focal points of the light beams reflected by nearby targets.

The disclosed subject matter thus creates a system that already blocks reflections from the near range in front of the detector, so that the result output by the detector has a higher weighting of light beams reflected by the remote target compared to light beams reflected by nearby targets. Arithmetic evaluations and processing of the detector output are thus no longer necessary for editing the measuring value results.

The optical device according to the disclosed subject matter can be used in a large number of fields of the prior art in which an active system is used for illumination, and a detector records the illumination reflection, for example in the case of a camera comprising a light source for illuminating a scene. In these cases, the light source can be arranged in any arbitrary immediate surroundings of the primary lens.

However, it is particularly advantageous if the light source, seen in the radiation direction of the light beam reflected by the remote target, is arranged in front of the primary lens in the optical path of the light beam, and the diaphragm is located in the shadow cast by the light source in the light beam reflected by the remote target. In particular, the light source is frequently arranged directly in front of the primary lens in laser measuring technology so as to couple the light beams thereof as coaxially as possible into the optical path of the incident light beams, either through the use of a small deflection mirror in the center of the primary lens, via which a laterally situated light source is coupled in, or by arranging a small light source, such as a laser diode, directly in front of the primary lens. In this position, the light source inevitably blocks a portion of the entire incident light, including the desirable light beams reflected by the remote target and the undesirable light beams reflected by nearby targets.

The disclosed subject matter takes advantage of this circumstance and positions the diaphragm in this shadow cast by the light source, however in a distance-selectively acting manner between the first focal point and the detector unit. Compared to state-of-the-art lens systems comprising a light source arranged in front of the primary lens, this does not result in any decrease of usable light beams reflected by the remote target, while the effect of the reduction of the reflection by nearby targets is completely preserved.

In the aforementioned embodiment, the diaphragm may take up the entire aforementioned shadow in said cross-section. This maximizes the light beams that are reflected by nearby targets and blocked by the diaphragm, wherein the light beams reflected by the remote target are not influenced by the diaphragm.

Optionally, at least one further diaphragm is arranged within a further cross-section, which is normal to the optical axis, of the light beam reflected by the remote target and between the first focal point and the detector unit. This is particularly advantageous when diaphragms are used that are thin compared to the distance between the first focal point and the detector unit, such as disk-shaped diaphragms. If only one thin disk diaphragm is used, it is possible for light beams reflected by nearby targets to intersect the optical axis in front of or behind the diaphragm and to be detected by the detector. This effect is minimized by using multiple diaphragms successively arranged along the optical axis, whereby the near range sensitivity is further reduced.

If multiple diaphragms are used, it is advantageous if the diaphragms have different cross-sectional surface areas, and if the surface area of the respective diaphragm increases, the further the respective diaphragm is located away from the first focal point. In this way, the diaphragm shape can be adapted to the optical path of the light beam reflected by the remote target, whereby the detected light portion reflected by the remote target is not reduced. Consequently, only a greater portion of light beams reflected by nearby targets is blocked.

The diaphragm may be an opaque structure supported by a glass plate. This maximizes the portion of usable light reflected by the remote target since the glass plate allows the light reflected by the remote target to pass without impairment in those areas in which the opaque structure is not introduced into the glass plate or applied thereon. In particular, no interfering webs or the like are required to position the diaphragm.

The shape of the diaphragm itself can essentially be arbitrary. It may be adapted to the shadow cast by the light source in the light beam reflected by the remote target. In principle, diaphragms having a rectangular, pillow-shaped or oval cross-section are conceivable. It is of particular advantage when the diaphragm is a round disk, since this is easy to manufacture and the effect thereof is easy to model for computer simulations.

The diaphragm can also be designed differently in the direction of the optical axis, for example in a bar shape or cone shape, instead of a disk shape, wherein again arbitrary cross-sections, as described above, may be used. The diaphragm may be a cone or a truncated cone, which widens, seen in the radiation direction of the light beam reflected by the remote target. This essentially corresponds to a "continuum" of consecutive, infinitesimally thin disk diaphragms having progressively larger diameters, which increases the blockage of light beams reflected by nearby targets compared to discrete single diaphragms or bar diaphragms.

In this embodiment, the apex angle of the cone may be substantially adapted to the optical path of the light beam reflected by the remote target. This provides a particularly high yield of light reflected by the remote target in the detector, with a maximum reduction of the light reflected by nearby targets.

The diaphragm, or the diaphragm of the diaphragms located closest to the first focal point, may be arranged at a distance of at least 100 µm from the first focal point. Adapting the distance from the first focal point allows the near range sensitivity of the optical device to be set flexibly, and the aforementioned values have proven to be a good compromise in practical experience.

In further advantageous embodiments, the diameter of the diaphragm may be 50% to 100%, optionally 80% to 100%, and in particular substantially 100%, of an image size B, which is equal to $G_R*d_1/f_1$, where $G_R$ is the beam diameter of an emitted light beam at a predetermined distance, $d_1$ is the distance between the diaphragm and the first focal point, and $f_1$ is the distance between the primary lens and the first focal point.

In this way, the portion of blocked light beams reflected by nearby targets, and thus the attenuation of the near range sensitivity of the device, can be pre-set. If the diameter of the diaphragm corresponds, for example, to 100% of the image size, the entire reflection of a nearby object is blocked, while only a fraction is blocked at less than 100%.

So as to achieve the distance between the first focal point and the detector unit required for the diaphragm, two different embodiments may be selected.

In a first embodiment of the disclosed subject matter, the optical device comprises a relay lens system, which is arranged between the first focal point and the detector unit and configured to focus the light beam reflected by the remote target and diverging starting from the first focal point onto a second focal point, wherein the detector unit is substantially arranged in the second focal point. Conventional detectors may be used in this embodiment, whereby the costs for the optical device can be kept low. The relay lens system can additionally be used to arrange special optical filters, such as an interference filter, in the region between the lenses of the relay lens system.

So as to facilitate the installation of the diaphragm, the diaphragm may be installed on the relay lens system in this embodiment, which is particularly simple in the case of the aforementioned cone shape, since the cone or truncated cone has a sufficiently large base surface area for the installation. However, even in the case of disk-shaped diaphragms, it is advantageous to install the diaphragm closest to the relay lens system on the relay lens system. Regardless of the diaphragm shape, the diaphragm can be glued to the relay lens system, for example.

In the embodiment comprising the relay lens system, it is also possible to use multiple relay lens systems in a cascaded manner, which offers advantages in terms of the design of the optical device when the installation of multiple diaphragms behind one another proves to be difficult. To achieve this, the optical device comprises a first relay lens system and a second relay lens system, which are arranged between the first focal point and the detector unit, wherein the first relay lens system is configured to focus the light beam reflected by the remote target and diverging starting from the first focal point onto a second focal point, and the second relay lens system is configured to focus the light beam reflected by the remote target and diverging starting from the second focal point onto a third focal point, wherein said diaphragm is arranged between the first focal point and the first relay lens system, and said further diaphragm is arranged between the second focal point and the second relay lens system, and wherein the detector unit is substantially arranged in the third focal point.

In a second embodiment of the disclosed subject matter, the detector unit is arranged in the region in which the light beam reflected by the remote target diverges starting from the first focal point, wherein the detector unit has a detection surface that extends across the entire cross-section of the light beam reflected by the remote target. In this embodiment, a relay lens system may be dispensed with, wherein, however, a larger detection surface is required for the detector unit than in the first embodiment. While large-surface-area detector units are more expensive, the length of the optical device can be reduced.

So as to minimize the necessary detection surface, the diaphragm can be mounted on the detector unit. Since the diaphragm is arranged at a predefined distance from the first focal point, the detector surface can be kept smaller when the detector unit is mounted on the diaphragm. Moreover, this also simplifies the installation of the diaphragm.

The distance between the diaphragm and the first focal point and/or the surface area of the diaphragm in the aforementioned cross-section and/or the position of the surface area of the diaphragm in said cross-section can be varied. This allows the diaphragm to be calibrated and individually configured, whereby a single optical device can be adapted to different fields of use and applications.

It is furthermore of advantage when the optical device also comprises a motor for this purpose, which is configured to vary said distance and/or said surface area and/or the position of the surface area of the diaphragm in said cross-section. This also allows the diaphragm to be automatically calibrated or configured while the laser scanner is being operated. This is particularly favorable, for example, when the optical device is used in a laser scanner that is not accessible during operation, for example in an unmanned aerial vehicle (UAV).

BRIEF DESCRIPTION OF THE DRAWINGS/FIGURES

The disclosed subject matter will be described hereafter in greater detail based on exemplary embodiments shown in the accompanying drawings. In the drawings.

DETAILED DESCRIPTION

Figure 1:
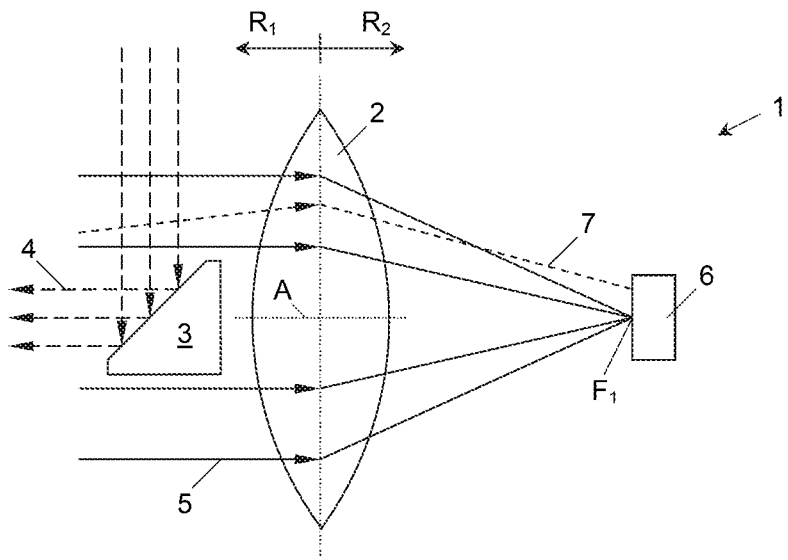
FIG. 1 shows an optical device for laser distance measurement according to the prior art in a schematic side view.

FIG. 1 shows an optical device 1 according to the prior art. In this optical device 1, which is typically used for laser distance measurement, a light source 3 located centrally in front of a primary lens 2 emits a light beam 4.

The light source 3 is a mirror in the present embodiment, which emits light provided by a further unit, for example laser light, in a predetermined direction $R_1$, which is substantially parallel to the optical axis A of the primary lens 2. As an alternative, the light source 2 can also directly be a light-generating laser diode, a lamp or the like.

When the emitted light beam 4 is reflected by a remote target (not shown), the light beam 5 reflected by the remote target is always substantially incident on the primary lens 2 in the direction $R_2$ opposite the emission direction $R_1$, parallel to the optical axis A, which is due to by the large distance between the remote target and the primary lens 2 in relation to the size of the primary lens 2.

The primary lens 2 is designed, for example by selecting an appropriate radius of curvature, so as to focus the light beam 5 reflected by the remote target in a first focal point $F_1$. For this purpose, the primary lens 2 can be designed as a convex lens 2, for example, or as another optical element able to focus incident light beams.

For the detection of the light beam 5 reflected by the remote target, a detector 6 is located in the first focal point $F_1$. For example, the detector 6 is an avalanche photodiode (APD), which is used as a highly sensitive photodiode and is thus also able to detect the light beam 5 reflected by the remote target in the case of low luminous power.

FIG. 1 furthermore shows a light beam 7 reflected by a nearby target, which was reflected by an undesirable near range target, for example an impurity in the air, an insect or the like. The light beam 7 reflected by the nearby target is incident on the primary lens 2 obliquely with respect to the optical axis A, which is due to the small distance between the nearby target and the primary lens 2 in relation to the size of the primary lens 2.

Light beams 7 reflected by a nearby target shall be understood to mean those light beams that were emitted by the light source 4 and reflected by a nearby target located at a distance of, e.g., less than 500 m, in particular less than 100 m, and most particularly less than 30 m from the primary lens 2. In contrast, light beams 5 reflected by a remote target shall be understood to mean those light beams that were emitted by the light source 4 and reflected by remote targets outside these distances.

Due to the oblique incidence direction of the light beam 7 reflected by the nearby target on the primary lens 2, this light beam is generally not focused onto the focal point $F_1$. Depending on the angle of incidence and incidence position on the primary lens 2, the light beam 7 reflected by the nearby target, however, is projected onto the detector 6, which detects the presence of the light beam and thus outputs an "incorrect" measurement result, which is to say a measurement result that does not correlate with the remote target to be detected.

Figure 2:
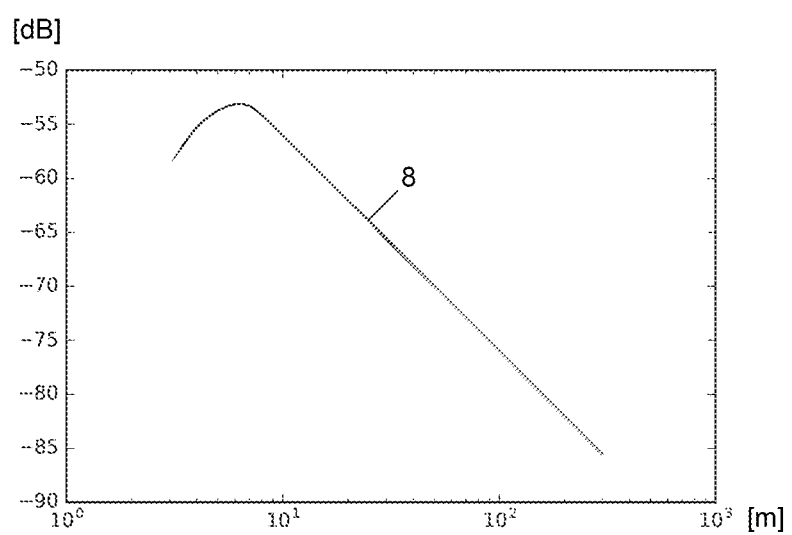
FIG. 2 shows a diagram of the distance-dependent relative received power of the device of FIG. 1.

FIG. 2 shows an amplitude curve 8 typical of the optical device 1, wherein the relative received power in [dB] detected by the detector 6 is plotted on the y axis and the distance from the target in [m] is plotted on the x axis. It is apparent that the reception sensitivity of the device 1 has a maximum precisely in the near range of approximately 5 m in which measurement results of interfering nearby targets are undesirable.

Figure 3:
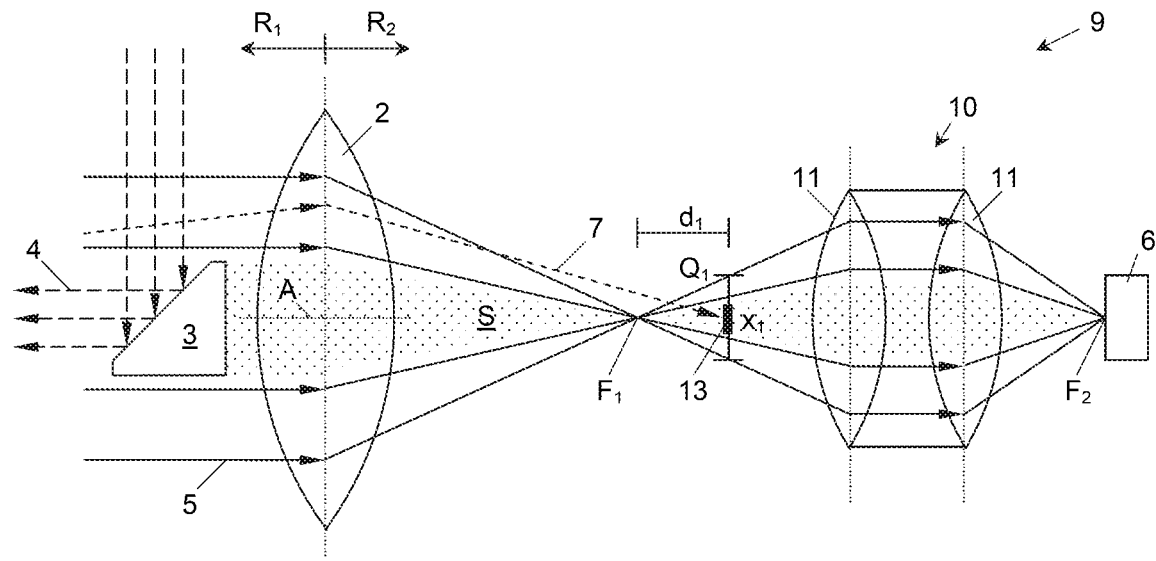
FIG. 3 shows a first embodiment of an optical device according to the disclosed subject matter for laser distance measurement, comprising a disk diaphragm, in a schematic side view.

FIG. 3 shows a first embodiment of an optical device 9 according to the disclosed subject matter, wherein reference numerals used with respect to FIG. 1 denote identical components. In particular, the angular ratios of the emitted light beams 4, 5, 7 which are reflected by the remote target and the nearby target are the same, wherein, however, the detector 6 assumes a different position, as will be described hereafter.

In the embodiment of FIG. 3, a relay lens system 10 is arranged in such a way that the first focal point $F_1$ is located between the primary lens 2 and the relay lens system 10, which is to say the relay lens system 10 is arranged behind the first focal point $F_1$ in the direction $R_2$ of the light beam 5 reflected by the remote target.

Figure 7:
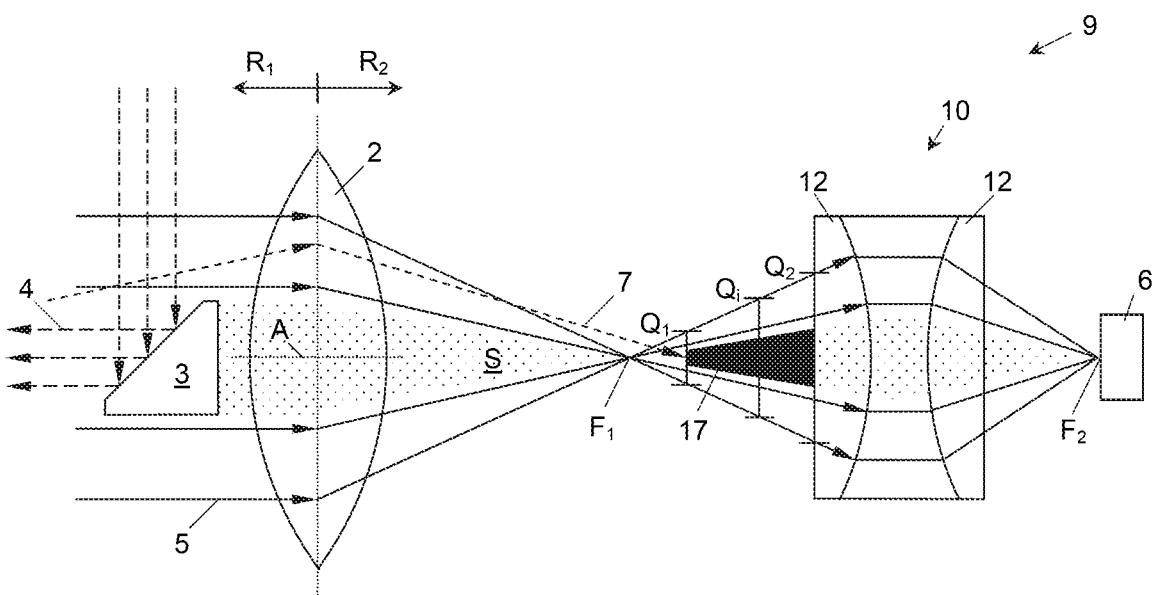
FIG. 7 shows a third embodiment of the optical device according to the disclosed subject matter for laser distance measurement, comprising a cone diaphragms, in a schematic side view.
Figure 8:
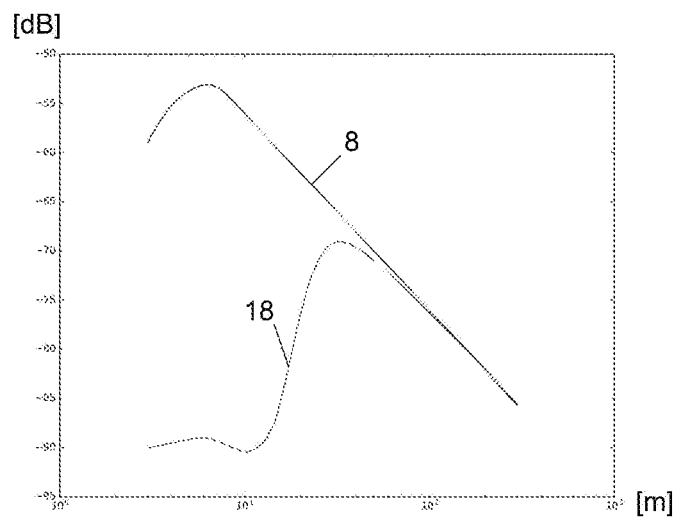
FIG. 8 shows a diagram of the distance-dependent relative received power of the device of FIG. 7.

The relay lens system 10 is designed to focus the light beam 5 reflected by the remote target and diverging starting from the first focal point $F_1$ onto a second focal point $F_2$, in which the detector 6 is located in the optical device 9. The relay lens system 10 can be designed, for example, as a convex lens, as two assembled convex lenses 11, as is shown in FIG. 3, or as two plano-convex lenses 12, as is shown in FIG. 7. If a relay lens system 10 comprising two lenses 11, 12 is used, a filter, such as an interference filter, can additionally be inserted between the two lenses 11, 12.

So as to block light beams 7 reflected by the nearby target, a diaphragm 13 is arranged within a cross-section $Q_1$, which is normal to the optical axis A, of the light beam 5 reflected by the remote target between the first focal point $F_1$ and the relay lens system 10. The diaphragm 13 is opaque and optionally does not include any openings.

As is shown in FIG. 3, the light source 3, as is customary in laser measuring technology, is arranged, seen in the radiation direction of the light beam 5 reflected by the remote target, in the optical path thereof centrally in front of the primary lens 2. An optical path of the light beam 5 reflected by the remote target shall be understood to mean herein the region which the light beam 5 reflected by the remote target traverses.

Due to the circumstance that the light source 3 is arranged in the optical path in front of the primary lens 2, the light source 3 casts a shadow S in the light beam 5 reflected by the remote target. A reduction in the amount of light reflected by the remote target which can be received by the detector 6 is thus already effectuated by the arrangement of the light source 3 in front of the primary lens 2, and the shadow S caused thereby. So as to not further impair the performance capability of the optical device 9 for the detection of light reflected by a remote target, the diaphragm 13 is located in the aforementioned shadow S of the light source 3.

In the exemplary embodiment of FIG. 3, the diaphragm 13 is a disk, which is to say it has a small thickness in the radiation direction $R_2$ of the light beam 5 reflected by the remote target. The shape of the disk can have an arbitrary cross-section $Q_1$, for example rectangular, circular or oval, or may also be adapted to the shape of the shadow S of the light source 3, and thus to the same itself. If the light source 3, for example, casts a shadow S having a round cross-section $Q_1$, the shape of the diaphragm 13 can also have a round cross-section $Q_1$.

The surface area $x_1$ of the diaphragm 13 in the cross-section $Q_1$ is 0.1 to 50%, for example, 0.5 to 25%, and particularly 1 to 10%, of the aforementioned cross-section $Q_1$ of the light beam 5 reflected by the remote target and can, in principle, be selected independently of the shadow S. As an alternative, the surface area $x_1$ of the diaphragm 13 in the cross-section $Q_1$ may be adapted to the shadow S cast by the light source 3, for example in such a way that the diaphragm 13 takes up the entire shadow in the cross-section $Q_1$. As an alternative, the surface area $x_1$ of the diaphragm 3 in the cross-section $Q_1$ may also have a predetermined ratio in relation to the shadow S and, for example, take up 50% of the shadow S.

In a further embodiment, the diameter of the diaphragm 13 can also be adapted to the size of the image, occurring in the cross-section $Q_1$, of the focal spot that results on an extensive nearby target located at a predefined distance R from the primary lens 2 when the beam diameter and the beam expansion of the emitted light beam 4 over the distance R are taken into consideration.

To entirely suppress the reflection of a nearby target located at the distance R, the diameter of the diaphragm 13 corresponds at least to an image size B where $$B = G_R * d_1/f_1,$$

where $G_R$ is the beam diameter of the emitted light beam 4 at the predetermined distance R, $d_1$ is the distance between the diaphragm 13 and the first focal point $F_1$, and $f_1$ is the distance between the primary lens 2 and the first focal point $F_1$. This results from the lens equation for a thin primary lens 2. The diameter of the diaphragm 13 can also be 50 to 100% or 80 to 100 of the aforementioned image size B, so as to block only a predetermined portion of light reflected by the nearby target.

If the diaphragm 13 is implemented as a disk, this may be a small plate supported by webs, for example, and thus be introduced between the primary lens 2 and the relay lens system 10. As an alternative, the diaphragm 13 can be an opaque structure supported by a glass plate, which is etched into the glass plate or glued thereon, for example.

The purpose of the diaphragm 13 is to block light beams 7 reflected by the nearby target, as is shown in FIG. 3. Light beams 7 reflected by the nearby target generally intersect the optical axis A between the first focal point $F_1$ and the relay lens system 10, whereby these impinge on the diaphragm 13 and are thus blocked. As described above, the light beams 5 reflected by the remote target are not impaired by this arrangement of the diaphragm 13 since the diaphragm 13 is arranged in the shadow S of the light source 3.

Figure 4:
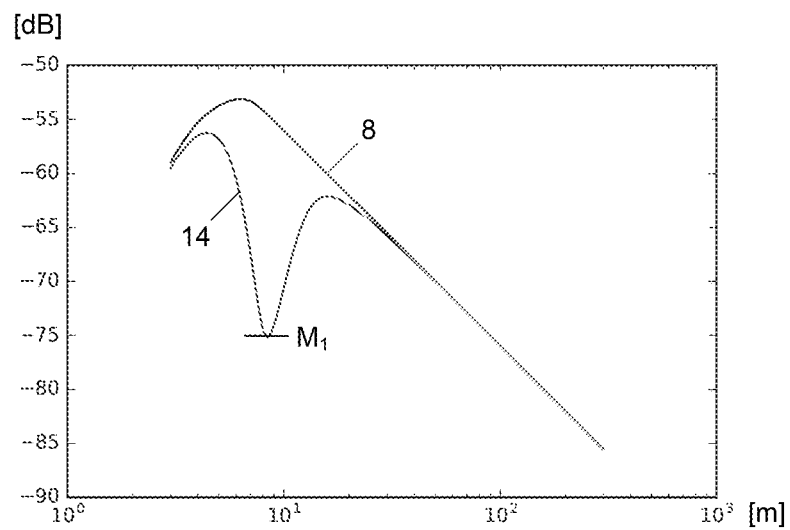
FIG. 4 shows a diagram of the distance-dependent relative received power of the device of FIG. 3.

FIG. 4 shows the effect of the diaphragm 13 in detail. Analogously to FIG. 2, the relative received power in [dB] is plotted on the y axis and the distance from the target in [m] is plotted on the x axis in FIG. 4. For reference, the typical amplitude curve 8 of the optical device 1 according to the prior art of FIG. 1 is also represented in FIG. 4.

The amplitude curve 14 shows the reception sensitivity of the optical device 9 of FIG. 3, comprising the diaphragm 13 between the first focal point $F_1$ and the relay lens system 6. The diaphragm 13 is arranged at a distance $d_1$ (FIG. 3) from the first focal point $F_1$. At this distance $d_1$, the primary lens 2, for example, refracts light beams 5 reflected by nearby targets that are located at a distance of 8 m in front of the primary lens 2. This causes a minimum $M_1$ of the amplitude curve 14 for a distance from the target of 8 m. The shape and relative depth of the minimum $M_1$ is dependent on the shape and size of the surface area $x_1$ of the diaphragm 13 in the cross-section $Q_1$ and can be experimentally ascertained by conducting tests or computation-ally ascertained by way of simulations.

Figure 5:
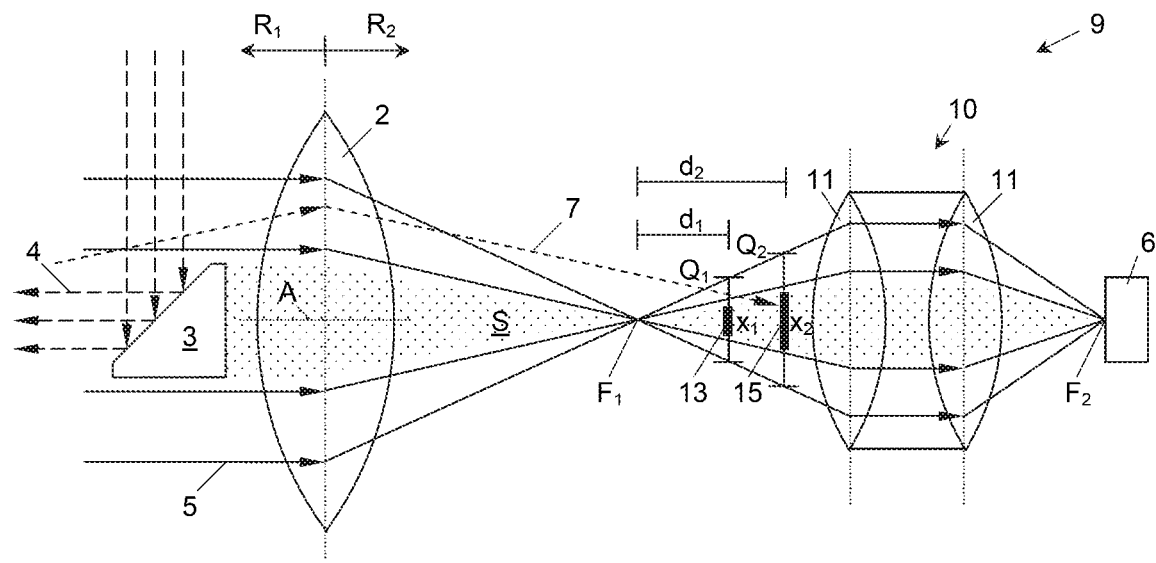
FIG. 5 shows a second embodiment of the optical device according to the disclosed subject matter for laser distance measurement, comprising two disk diaphragms, in a schematic side view.

FIG. 5 shows a variant of the optical device 9 of FIG. 3, in which, in addition to the diaphragm 13, a further diaphragm 15 is arranged within a further cross-section $Q_2$, which is normal to the optical axis A, of the light beam 5 reflected by the remote target between the first focal point $F_1$ and the relay lens system 10. The further diaphragm 15 is arranged at a distance $d_2$ from the first focal point $F_1$, the distances $d_1$ and $d_2$ being different.

The further diaphragm 15 can structurally be designed identically to the diaphragm 13, for example as a disk, and can also be produced in the same manner as the diaphragm 13, for example as a small plate comprising webs or as an opaque structure supported by a glass plate. It is also possible for the respective cross-sections $Q_1$, $Q_2$ of the diaphragm 13 and of the further diaphragm 15 to have the same shape or a different shape, such as circular, oval or rectangular.

The surface areas $x_1$, $x_2$ of the diaphragm 13 and of the further diaphragm 15 can also have the same size in the respective cross-section $Q_1$, $Q_2$. As an alternative, the diaphragms, as is shown in FIG. 5, have different surface areas $x_1$, $x_2$ in the cross-section, wherein the surface area $x_1$, $x_2$ thereof increases, the closer the respective diaphragm 13, 15 is arranged to the relay lens system 10. The size of the respective surface area $x_1$, $x_2$ may follow the optical path of the light beam 5 reflected by the remote target between the first focal point $F_1$ and the relay lens system 10, so that the ratio of the distances $d_1$, $d_2$ to the surface areas $x_1$, $x_2$ in the cross-section $Q_1$, $Q_2$ is constant, which is to say $d_1/x_1 = d_2/x_2$.

The diaphragm 13 closest to the first focal point $F_1$ is arranged at a distance of at least 100 μm from the first focal point $F_1$ to ensure that the light beam 5 reflected by the remote target is not blocked by the diaphragm 13. This also applies to the embodiment of FIG. 3.

Figure 6:
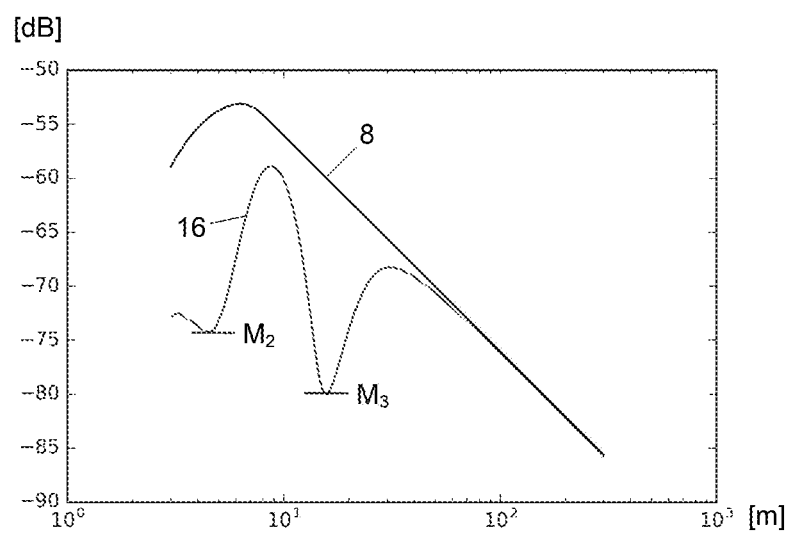
FIG. 6 shows a diagram of the distance-dependent relative received power of the device of FIG. 5.

Analogously to FIG. 2 and FIG. 4, FIG. 6 shows the relative received power in [dB] on the y axis and the distance from the target in [m] on the x axis, wherein, in addition to the amplitude curve 16 of the optical device 9 of FIG. 5, the amplitude curve 8 of the optical device 1 of FIG. 1 is shown for reference.

In the example of FIGS. 5 and 6, the distance $d_1$ of the diaphragm 13 was selected so as to correspond to a distance from the target of 5 m, and the distance $d_2$ was selected so as to correspond to a distance from the target of 15 m. This causes two minima $M_2$, $M_3$ of the amplitude curve 16 for the distances from the target of 5 m and 15 m.

FIG. 7 shows a further variant of the optical device 9 of FIG. 3, in which, instead of a disk-shaped diaphragm 13, a diaphragm 17 having a truncated cone shape is arranged between the first focal point $F_1$ and the relay lens system 10. The shape of the diaphragm 15 is expanded here, seen in the radiation direction $R_2$ of the light beam 5 reflected by the remote target, and could also be designed as a cone. As an alternative, a non-expanding bar shape could also be used here, instead of the cone or truncated cone shape.

The apex angles of the cone or truncated cone shape of the diaphragm 17 can essentially be arbitrarily selected. In the exemplary embodiment of FIG. 7, the apex angle was adapted to the optical path of the light beam 5 reflected by the remote target.

The conical diaphragm 17 of FIG. 7 is thus arranged not only within a cross-section, but within a continuum of cross-sections $Q_i$ of the light beam 5 reflected by the remote target between the first focal point $F_1$ and the relay lens system 10. Within this meaning, the diaphragm 17 can be defined in terms of the cone or truncated cone shape by being arranged within cross-sections $Q_i$ between a first cross-section $Q_1$ at a distance $d_1$ from the first focal point $F_1$ and a last cross-section $Q_2$ at a distance $d_2$ from the first focal point $F_1$.

The first cross-section $Q_1$ does not coincide with the first focal point $F_1$, but is spaced at a minimum distance $d_1$ therefrom to ensure that the light beam 5 reflected by the remote target is not blocked by the diaphragm 17. For example, the first cross-section $Q_1$ is located at a distance $d_1$ of 100 μm from the first focal point $F_1$.

The embodiment of FIG. 7 is not subject to any restrictions with respect to the variants described for FIGS. 3 and 5. It is possible, for example, to use two diaphragms 17 having a cone or truncated cone shape, which are mounted using webs or designed as opaque structures supported by (thick) glass plates. If the diaphragm 17 is designed in the shape of a cone or truncated cone, installing the diaphragm 17 on the relay lens system 10 is an obvious choice. For this purpose, the base of the cone or truncated cone of the diaphragm 17 can be glued to the relay lens system 10, for example, which for this purpose can optionally have a planar design on the side of the diaphragm 17.

Similarly, however, it would also be possible to mount the disk-shaped diaphragm 13, 15 of FIGS. 3 and 5 closest to the relay lens system 10 directly on the relay lens system 10, such as by gluing.

Analogously to FIGS. 2, 4 and 6, FIG. 8 shows the amplitude curve 18 of the optical device 9 of FIG. 7, wherein the relative received power in [dB] is plotted on the y axis and the distance from the target in [m] is plotted on the x axis, and the amplitude curve 8 of the optical device 1 of FIG. 1 is shown for reference.

Figure 9:
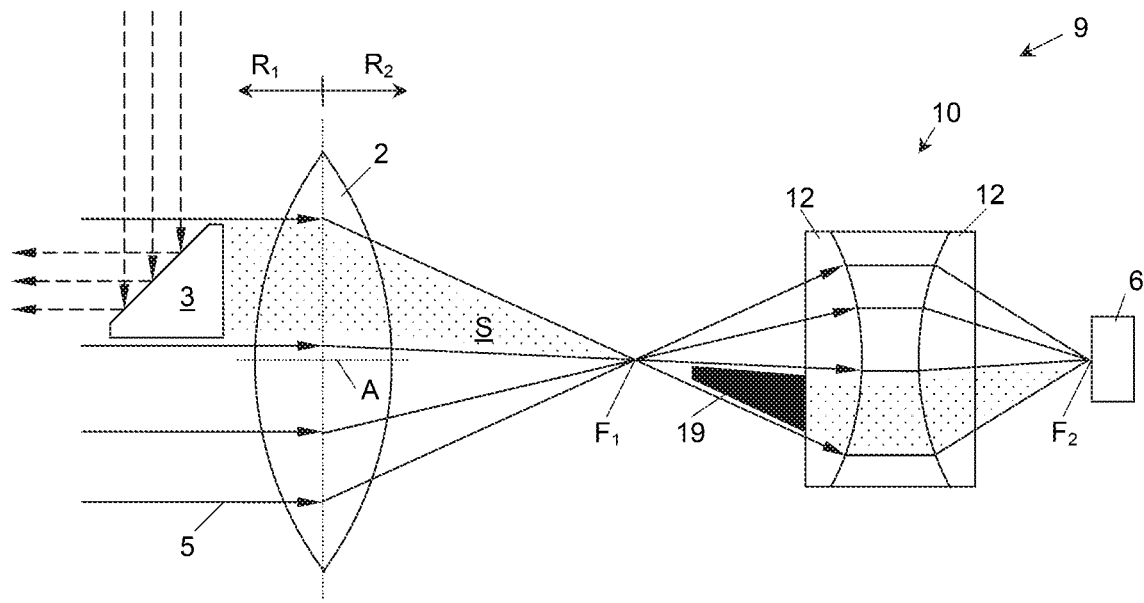
FIG. 9 shows a fourth embodiment of the optical device according to the disclosed subject matter for laser distance measurement, comprising an oblique cone diaphragm, in a schematic side view.

It is apparent from the amplitude curve 18 that, in contrast to the amplitude curves 14 and 16 of FIGS. 2 and 4, the conical or truncated cone-shaped diaphragm 17 of FIG. 9 does not form any discrete minima, but a substantially continuous minimum at the level of −90 dB.

Figure 10:
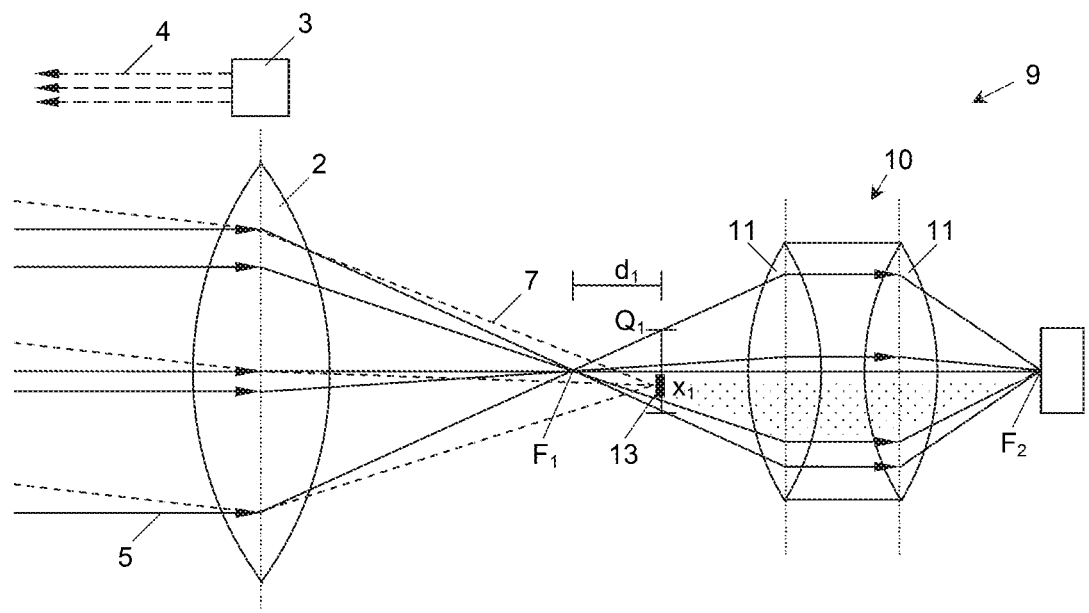
FIG. 10 shows a fifth embodiment of the optical device according to the disclosed subject matter for laser distance measurement, comprising a disk diaphragm and an offset light source, in a schematic side view.

FIGS. 9 and 10 show further embodiments according to which the light source 3 is arranged decentrally in front of the primary lens 2 (FIG. 9) or not at all in front of the primary lens 2 (FIG. 10).

It is apparent from FIG. 9 that a light source 3 arranged asymmetrically with respect to the optical axis A 19, casts an asymmetrical shadow S. If a diaphragm 19 is arranged in the shadow S of the light source 3 here, the shape thereof is adapted accordingly to the shadow S. For this purpose, a diaphragm 19 that is arranged asymmetrically about the optical axis A and designed as an oval disk or as an oblique cone or oblique truncated cone, as is shown in FIG. 9, can be used. In such embodiments, the reception sensitivity of the device 9 for light beams 5 reflected by the remote target is not impaired by the diaphragm 19 when this is arranged in the shadow S. The diaphragm 19, however, blocks at least a portion of light beams 7 reflected by the nearby target, whereby the near range sensitivity of the optical device 9 is reduced.

FIG. 10 shows an embodiment in which the light source 3 is arranged next to the primary lens 2, and not in front thereof. Due to this offset of the light source 3 in relation to the primary axis A, light beams reflected by the nearby target are not incident parallel to the optical axis A. So as to compensate for this effect, the diaphragm 13 can be arranged eccentrically with respect to the primary lens 2 to block a larger portion of light beams 7 reflected by the nearby target, as is shown schematically in FIG. 10.

It is directly apparent that no shadow S is cast by the light source 3 in this embodiment. However, if the diaphragm is arranged similarly to what is shown in FIG. 3, surprisingly essentially the same amplitude curve 14 as in the embodiments of FIGS. 3 and 4 is achieved, in which the diaphragm 13 completely took up the shadow S in the cross-section $Q_1$, apart from the above-described effect of the eccentrically incident light beams 7 reflected by the nearby target. This is due to the fact that, in this case, the light beams 5 reflected by the remote target are not blocked by the light source 3, but by the diaphragm 13.

Instead of the disk shape of the diaphragm 13 of FIG. 10, again any other diaphragm shape, such as those previously described for FIGS. 3 to 9, can be used, and accordingly the same amplitude curves are achieved as if the diaphragm were arranged in the shadow of the light source 3.

Figure 11:
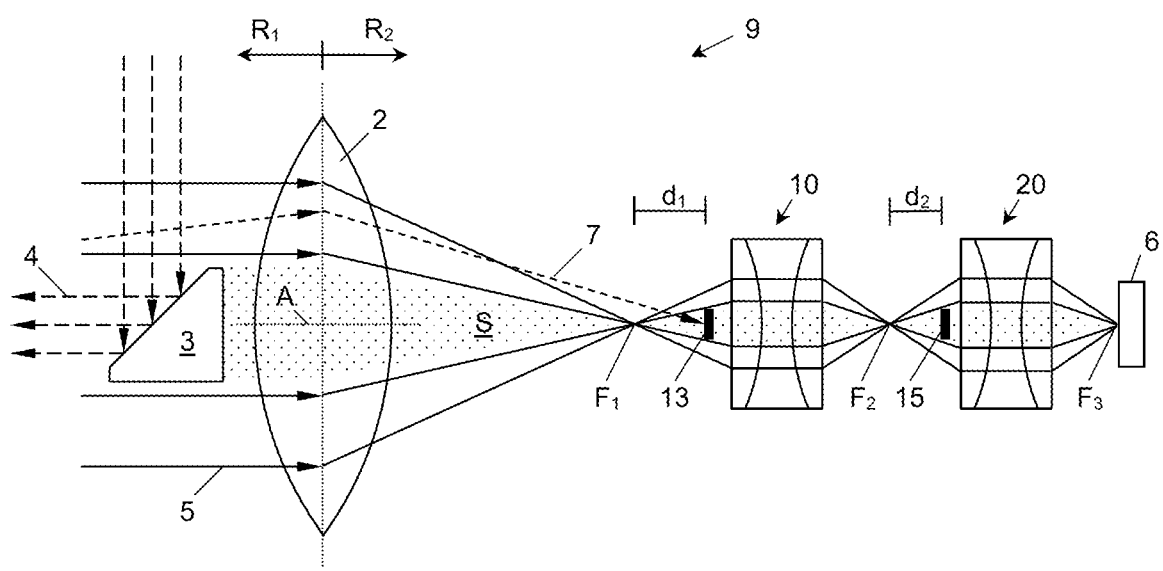
FIG. 11 shows a sixth embodiment of the optical device according to the disclosed subject matter for laser distance measurement, comprising cascaded relay lens systems.

FIG. 11 shows an embodiment in which multiple relay lens systems 10, 20 are arranged in a cascaded manner, so that a dedicated diaphragm 13, 15 can be provided for each relay lens system 10, 20.

In this embodiment, the first relay lens system 10 focuses the light beam 5 reflected by the remote target and diverging starting from the first focal point $F_1$ onto a second focal point $F_2$, and the second relay lens system 20 focuses the light beam 5 reflected by the remote target and diverging starting from the second focal point $F_2$ onto a third focal point $F_3$, wherein the detector unit 6 is essentially arranged in the third focal point $F_3$, resulting in the cascade-shaped arrangement.

The diaphragms are arranged here in such a way that the aforementioned diaphragm 13 is arranged between the first focal point $F_1$ and the first relay lens system 10, and the aforementioned further diaphragm 15 is arranged between the second focal point $F_2$ and the second relay lens system 20. The distances $d_1$, $d_2$ between the diaphragms 13, 15 and the respective closest focal points $F_1$, $F_2$ can be selected in such a way that the diaphragms 13, 15 suppress light beams 7 reflected by the nearby target from different target distances in front of the primary lens 2.

In all embodiments, it is possible to use disk-, cone- or truncated cone-shaped diaphragms. Optionally, however, disk diaphragms are used, and the diameters of the diaphragms can be rendered dependent on the respective distance $d_1$, $d_2$ between the diaphragm 13, 15 and the respective closest focal point $F_1$, $F_2$.

It goes without saying that the shown cascade shape can also be expanded by using more than two relay lens systems, each comprising a diaphragm 13, instead of two relay lens systems 10, 20 comprising a respective lens 13, 15. Furthermore, it is possible to use more than one diaphragm for at least one of the relay lens systems 10, 20.

The different relay lens systems 10, 20 can have an identical design or different designs, for example one having convex lenses, as shown in FIG. 3, and the other(s) having plano-convex focal lengths, as shown in FIG. 7, and/or having different focal lengths.

Figure 12:
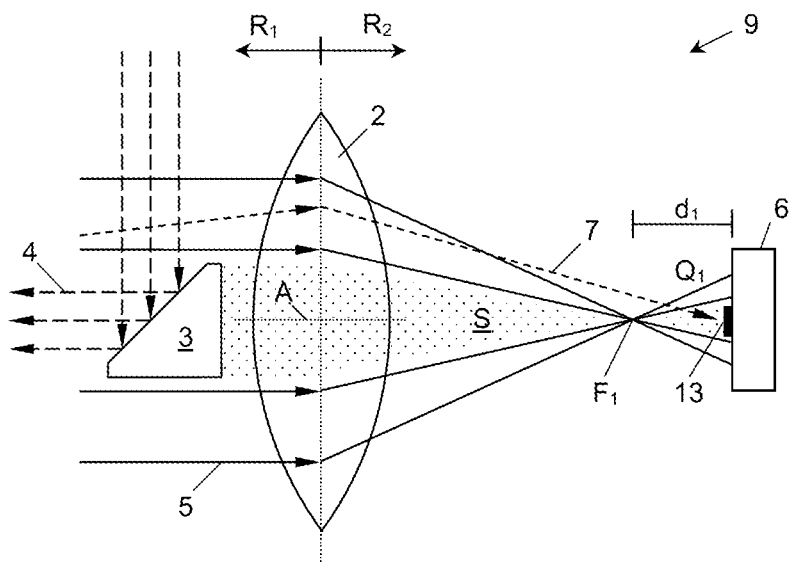
FIG. 12 shows a seventh embodiment of the optical device according to the disclosed subject matter for laser distance measurement, comprising a large-surface-area detector unit.

FIG. 12 shows a variant of the optical device 1 from FIG. 3 in which no relay lens system 10 is used. Instead, the detector unit 6 is arranged in the region in which the light beam 5 reflected by the remote target diverges starting from the first focal point $F_1$, wherein the detector unit 6 includes a detection surface, which extends across the entire cross-section of the light beam 5 reflected by the remote target and thus has a larger detection surface than the detector unit 6 of the embodiment from FIG. 3.

If the diaphragm 13 is mounted directly on the detector unit 6, the distance between the first focal point $F_1$ and the detector unit 6 can essentially be reduced to the distance $d_1$ between the first focal point $F_1$ and the diaphragm 13. In principle, however, the detector unit 6 can also be spaced apart from the diaphragm 13. The embodiment from FIG. 11 having a large-surface-area detector unit is, in general, also suitable for diaphragms 13 having a cone or truncated cone shape, such as those shown in FIGS. 7 and 9.

In all shown embodiments, furthermore the distances $d_1$ between the diaphragms 13, 15, 17, 19 and the first focal point $F_1$ and/or the surface areas $x_1$, $x_2$ of the diaphragms 13, 15, 17, 19 in the aforementioned cross-sections $Q_1$, $Q_2$ and/or the positions of the surface areas $x_1$, $x_2$ of the diaphragms 13, 15, 17, 19 in the aforementioned cross-sections $Q_1$, $Q_2$ can be variable, for example in that the diaphragms 13, 15, 17, 19 are arranged so as to be manually displaceable along the optical axis A, or normal thereto.

If a disk diaphragm is used, this can be composed of multiple crescent-shaped lamellae, for example, which allow the surface area of the disk diaphragm to be increased or decreased by way of a rotational movement.

Cone or truncated cone-shaped diaphragms can be provided with a variable apex angle, or telescoping bars can be used as an alternative, whereby the surface area of the diaphragm in the respective cross-section $Q_i$ changes as a function of the telescoped state.

Instead of moving the diaphragms 13, 15, 17, 19 manually, these may also be moved by a motor, which varies the aforementioned distances $d_1$, $d_2$, the aforementioned surface areas $x_1$, $x_2$ and/or the aforementioned positions.

In all aforementioned embodiments, the diaphragms 13, 15, 17, 19 can leave the outer edge of the cross-section $Q_i$ free, so that the entire surface area $x_1$ of the diaphragms 13, 15, 17, 19 is located within the aforementioned cross-section $Q_i$. The diaphragms 13, 15, 17, 19 can be arranged at a predetermined minimum distance from the outline of the cross-section $Q_i$. As an alternative, the diaphragms 13, 15, 17, 19 can also protrude laterally from the outside into the cross-section $Q_i$. In these variants, the diaphragms 13, 15, 17, 19 leave at least 50%, optionally at least 70%, and in particular at least 90% of the outline of the cross-section $Q_i$ free, for example. The diaphragms 13, 15, 17, 19 can furthermore be without openings and/or be arranged so as to intersect the optical axis A.

Generally, speaking, the diaphragms 13, 15, 17, 19 are arranged and/or designed in such a way that these block a larger portion of light beams 7 reflected by the nearby target than of light beams 5 reflected by the remote target.

The disclosed subject matter is thus not limited to the shown embodiments, but encompasses all variants, modifications and the combinations thereof that are covered by the scope of the accompanying claims.

What is claimed is:

1. An optical device for detecting a light beam reflected by a remote target, comprising:
    a light source, which is configured to emit the light beam in a predetermined direction at the remote target;
    a primary lens, which has an optical axis that is located substantially parallel to said predetermined direction and is configured to focus the light beam reflected by the remote target in a first focal point; and
    a detector unit for detecting focused light,
    wherein the detector unit is arranged in such a way that the first focal point is located between the primary lens and the detector unit, wherein a diaphragm is arranged within a cross-section, which is normal to the optical axis, of the light beam reflected by the remote target, the diaphragm being arranged between the first focal point and the detector unit, and wherein the diaphragm is configured to block a higher portion of light beams reflected by a nearby target, which is closer to the primary lens than the remote target, than of light beams reflected by the remote target, to attenuate a near range sensitivity of the optical device.

2. The optical device according to claim 1, wherein the light source, seen in the beam direction of the light beam reflected by the remote target, is arranged in front of the primary lens in the optical path of the light beam, and the diaphragm is located in the shadow cast by the light source in the light beam reflected by the remote target.

3. The optical device according to claim 2, wherein the diaphragm takes up the entire aforementioned shadow in said cross-section.

4. The optical device according to claim 1, wherein at least one further diaphragm is arranged within a further cross-section, which is normal to the optical axis, of the light beam reflected by the remote target and between the first focal point and the detector unit.

5. The optical device according to claim 4, wherein the diaphragms have different surface areas in their cross-sections, and that the surface area of the respective diaphragm increases, the further the respective diaphragm is located away from the first focal point.

6. The optical device according to claim 1, wherein the diaphragm is an opaque structure supported by a glass plate.

7. The optical device according to claim 1, wherein the diaphragm is a round disk.

8. The optical device according to claim 1, further comprising a relay lens system, which is arranged between the first focal point and the detector unit and configured to focus the light beam reflected by the remote target and diverging starting from the first focal point onto a second focal point, the detector unit being substantially arranged in the second focal point.

9. The optical device according to claim 8, wherein the diaphragm is mounted on the relay lens system.

10. An optical device for detecting a light beam reflected by a remote target, comprising:
a light source, which is configured to emit the light beam in a predetermined direction at the remote target;
a primary lens, which has an optical axis that is located substantially parallel to said predetermined direction and is configured to focus the light beam reflected by the remote target in a first focal point; and
a detector unit for detecting focused light,
wherein the detector unit is arranged in such a way that the first focal point is located between the primary lens and the detector unit,
wherein a diaphragm is arranged within a cross-section, which is normal to the optical axis, of the light beam reflected by the remote target, the diaphragm being arranged between the first focal point and the detector unit, and
wherein at least one further diaphragm is arranged within a further cross-section, which is normal to the optical axis, of the light beam reflected by the remote target and between the first focal point and the detector unit,
further comprising a first and a second relay lens system, which are arranged between the first focal point and the detector unit, wherein the first relay lens system is configured to focus the light beam reflected by the remote target and diverging starting from the first focal point onto a second focal point, and the second relay lens system is configured to focus the light beam reflected by the remote target and diverging starting from the second focal point onto a third focal point,
wherein said diaphragm is arranged between the first focal point and the first relay lens system, and said further diaphragm is arranged between the second focal point and the second relay lens system, and
wherein the detector unit is substantially arranged in the third focal point.

11. The optical device according to claim 1, wherein the detector unit is arranged in the region in which the light beam reflected by the remote target diverges starting from the first focal point, wherein the detector unit has a detection surface that extends across the entire cross-section of the light beam reflected by the remote target.

12. The optical device according to claim 11, wherein the diaphragm is mounted on the detector unit.

13. The optical device according to claim 1, wherein at least one of: the distance between the diaphragm and the first focal point, the surface area of the diaphragm in the aforementioned cross-section, and the position of the surface area of the diaphragm in said cross-section are variable.

14. An optical device for detecting a light beam reflected by a remote target, comprising:
a light source, which is configured to emit the light beam in a predetermined direction at the remote target;
a primary lens, which has an optical axis that is located substantially parallel to said predetermined direction and is configured to focus the light beam reflected by the remote target in a first focal point; and
a detector unit for detecting focused light,
wherein the detector unit is arranged in such a way that the first focal point is located between the primary lens and the detector unit,
wherein a diaphragm is arranged within a cross-section, which is normal to the optical axis, of the light beam reflected by the remote target, the diaphragm being arranged between the first focal point and the detector unit, and
wherein the diaphragm is a cone or a truncated cone that widens, seen in the radiation direction of the light beam reflected by the remote target.

15. The optical device according to claim 14, wherein the apex angle of the cone is substantially adapted to the optical path of the light beam reflected by the remote target.

16. The optical device according to claim 13, further comprising a motor, which is configured to vary at least one of: said distance, said surface area, and said position.

17. An optical device for detecting a light beam reflected by a remote target, comprising:
a light source, which is configured to emit the light beam in a predetermined direction at the remote target;
a primary lens, which has an optical axis that is located substantially parallel to said predetermined direction and is configured to focus the light beam reflected by the remote target in a first focal point; and
a detector unit for detecting focused light,
wherein the detector unit is arranged in such a way that the first focal point is located between the primary lens and the detector unit,
wherein a diaphragm is arranged within a cross-section, which is normal to the optical axis, of the light beam reflected by the remote target, the diaphragm being arranged between the first focal point and the detector unit, and wherein the diaphragm closest to the first focal point is arranged at a distance of at least 100 µm from the first focal point.

18. An optical device for detecting a light beam reflected by a remote target, comprising:
- a light source, which is configured to emit the light beam in a predetermined direction at the remote target;
- a primary lens, which has an optical axis that is located substantially parallel to said predetermined direction and is configured to focus the light beam reflected by the remote target in a first focal point; and
- a detector unit for detecting focused light,
- wherein the detector unit is arranged in such a way that the first focal point is located between the primary lens and the detector unit,
- wherein a diaphragm is arranged within a cross-section, which is normal to the optical axis, of the light beam reflected by the remote target, the diaphragm being arranged between the first focal point and the detector unit, and
- wherein the diameter of the diaphragm is 50% to 100% of an image size B, which is equal to $G_R * d_1/f_1$, where $G_R$ is the beam diameter of an emitted light beam at a predetermined distance R, $d_1$ is the distance between the diaphragm and the first focal point, and $f_1$ is the distance between the primary lens and the first focal point.

19. The optical device according to claim 18, wherein the diameter of the diaphragm is 80% to 100% of said image size B.

20. The optical device according to claim 18, wherein the diameter of the diaphragm is substantially 100% of said image size B.

* * * * *